April 13, 1954 F. M. TRANGMAR 2,674,801
DENTAL MATRIX
Filed Feb. 12, 1952 2 Sheets-Sheet 1
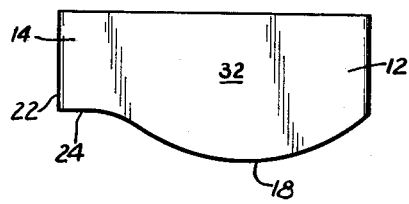
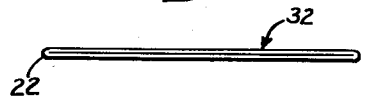
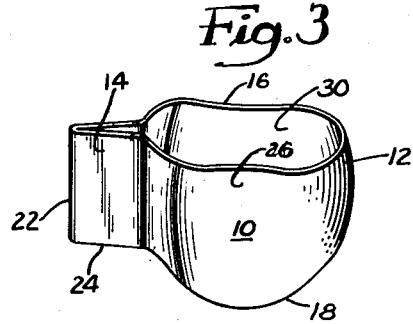
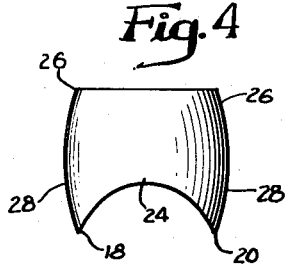
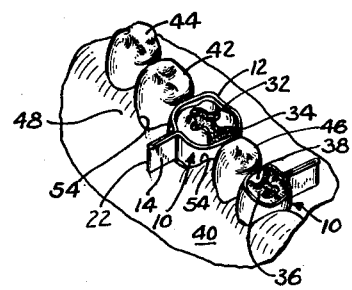
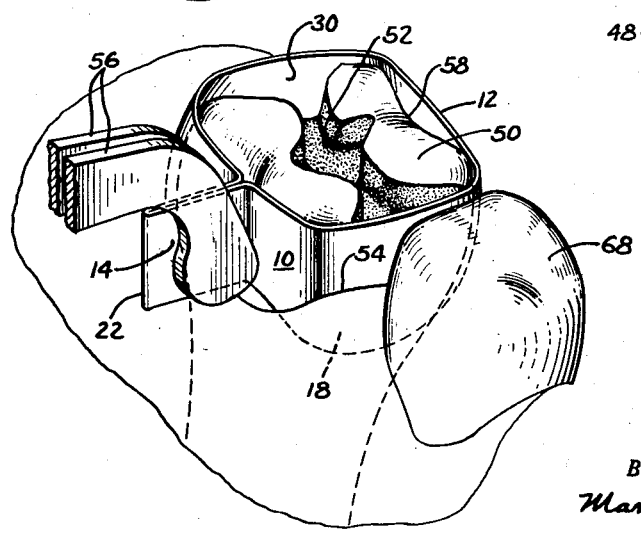
INVENTOR.
Frank M. Trangmar
BY
Mann, Brown and Handmann
Atty s.

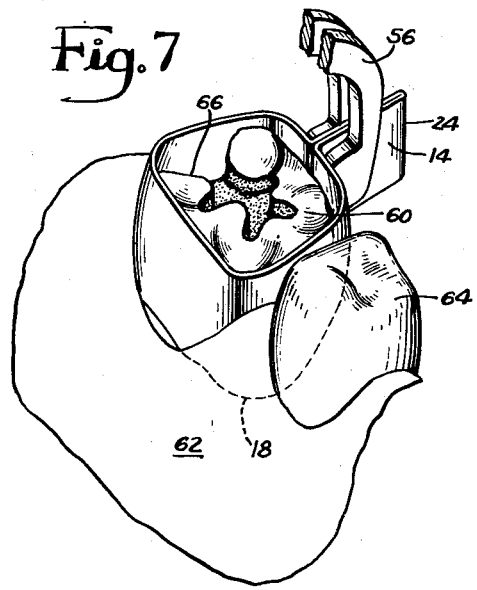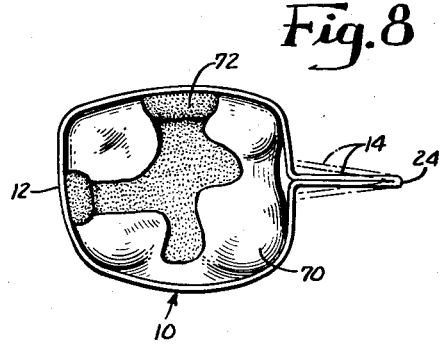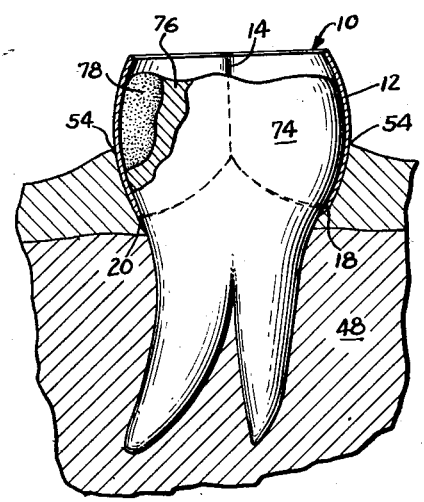

Patented Apr. 13, 1954

2,674,801

UNITED STATES PATENT OFFICE 2,674,801

DENTAL MATRIX

Frank M. Trangmar, Ravinia, Ill.

Application February 12, 1952, Serial No. 271,130

5 Claims. (Cl. 32—63)

The present invention relates to dental matrices and more particularly to a preformed malleable or ductile matrix capable of ready application to a tooth without the use of special tools and of easy removal therefrom after the same has served its purpose.

The improved dental matrix comprising the present invention is primarily adapted for use in connection with the making of wax impressions for inlay work on teeth of the bicuspid or molar variety. The matrix will also be found useful in the application of amalgam or other dental fillings to such teeth.

Heretofore, numerous types and shapes of matrices have been devised for facilitating filling and inlay work. Most of these devices follow a similar pattern both as to their shape and their manner of application to the tooth undergoing treatment. Almost invariably these matrices consist of a flat strip of thin flexible spring steel of a width approximately equal to the height of the tooth and of a length somewhat greater than the circumference thereof. More often than not, these strips are formed with a single medial curved or bowed edge portion along the bottom edge of the strip which is adapted to extend into the interproximal regions of the tooth when the strip is wrapped around the tooth preparatory to the performance of the dental work. Because of the fact that the material of the strip is not readily yieldable, this bowed portion will not readily adapt itself to the configuration of the tooth circumference and ordinarily it will tend to stretch the gum when the matrix holder is applied, thus causing discomfort to the patient as well as interfering with the dental operation.

The strip is adapted to be wrapped around the tooth and the ends thereof brought together by a special matrix holder or clamping tool, of which there are many varieties, usually having associated therewith some type of leverage action for progressively drawing or "festooning" the strip about the tooth and for holding the strip in place when the necessary degree of tension has been applied to the ends of the strip.

Matrices of this type are not only relatively costly, but the special matrix holder required for their application is an expensive instrument. In use it is cumbersome and, since it must necessarily remain in a position to hold the free ends of the resilient matrix together when the matrix is operatively positioned on a tooth, it presents an obstacle to freedom of movement in and around the vicinity of the tooth underoing treatment. This type of matrix when properly wrapped around a tooth undergoing treatment assumes a generally straight sided tubular configuration. Since the material of the matrix is yieldable only in the direction of wrapping, the depending lip provided at the lower edge of the matrix and which extends into the interproximal regions of the tooth cannot easily follow the contour of the tooth structure and thus when a particular tooth curves inwardly at the interproximal regions, the lip extends downwardly into the interproximal area and is spaced from the root portion of the tooth, thus unduly stretching the tissue regions surrounding the tooth and causing discomfort to the patient.

Another disadvantage which is attendant upon the use of matrices of this type resides in the fact that the spring steel material of which the matrix is formed possesses sufficient resistance to the wrapping operation by the matrix holder that it will not readily follow the circumferential curvature of the tooth, particularly where this curvature is sharp, as for example where it extends around a mesial or distal corner. Thus, the matrix when in its final position on a tooth frequently will present bulge areas where the inner surface of the matrix does not closely follow the outer contour of the tooth.

The present invention is designed to overcome the above noted limitations that are attendant upon the use of conventional matrices and toward this end it contemplates the provision of a relatively simple, inexpensive, preformed matrix which may be manufactured either of molar or bicuspid size and which, in its preformed state, presents a matrix cavity having a configuration which corresponds substantially to the overall configuration of the portion of the tooth to which it is to be applied, so that upon application thereto a minimum amount of manual deformation of the matrix will be required, and a minimum amount of the dentist's time will be consumed in fitting it to the tooth. The invention further contemplates the provision of a matrix of this character which may readily be applied to a tooth, the only tool required for its application being ordinary pliers and scissors The provision of a matrix of the type briefly outlined above being among the principal objects of the invention, another object is to provide a matrix of this sort which is extremely ductile but which possesses a negligible amount of resiliency so that when the matrix is positioned on a tooth it may easily be shaped about the tooth and when so shaped will retain its form without necessitating the use of a matrix holder.

It is another object of the invention to provide a preformed matrix having inner walls designed to be contracted against the outer mating surface of the tooth together with means engageable by ordinary forceps for facilitating contracting of the matrix walls against the tooth by a progressive pinching, gathering or "taking up" operation.

A still further object of the invention is to provide a preformed matrix of the character briefly outlined above having associated therewith depending mesial and distal lips on opposite sides of the matrix adapted to be received within the interproximal areas of the tooth undergoing treatment and which are bowed downwardly and inwardly so as to follow the curvature of the tooth at the base thereof and below the gum line thereby to prevent undue stretching of the tissue area, and provide a better fit for the reception of, and the contouring of, the filling or wax material being molded.

Yet another object of the invention is to provide such a matrix in which the tooth-receiving cavity region thereof is outwardly expansible so that the inwardly-bowed depending interproximal lips, above referred to, may be spread outwardly to clear the sides of the tooth during installation of the matrix, and thereafter contracted when the matrix is in its approximate position on the tooth so as to bring the interproximal lips into close engagement with the base of the tooth without stretching the tissue area.

Another object of the invention is to provide a dental matrix having associated therewith an operating or purchase region which is offset from the tooth-receiving matrix cavity for convenient manipulation during application of the matrix to a tooth for tightening the matrix around the tooth and in which this purchase region of the matrix is of slight extent so that it in many cases is not necessary to employ cotton rolls or other devices for maintaining the lips, cheek, or other flesh portions surrounding the mouth away from the immediate vicinity of operations.

A still further object of the invention is to provide a matrix of the character briefly outlined above in which a more perfect adaptation of the wax material, in the case of deep interproximal inlay work, i. e. where the cavity extends far below the gum line, may be attained by virtue of the adaptability of the yieldable matrix to the contour of the tooth in this region.

The provision of a matrix which may conveniently be constructed from tubular stock by a single stamping operation followed by a forming operation and which, therefore, may be manufactured at a cost sufficiently low to warrant disposal of the matrix after use; one which, although very ductile, is possessed of sufficient rigidity after application to a tooth to withstand operating pressures; one which presents no discomfort to the patient, and one which may be installed and removed with such ease and rapidity as to save considerable time on the part of the dentist are further desirable features that have been borne in mind in the production and development of the present invention.

Other objects and advantages of the invention, not at this time enumerated, will become more readily apparent as the nature of the invention is better understood.

In the accompanying two sheets of drawings forming a part of this specification, two embodiments of the invention have been shown.

In these drawings:

Fig. 1 is a side elevational view of a flattened tubular blank from which the improved matrix comprising the present invention may be formed;

Fig. 2 is a top edge elevational view of the blank shown in Fig. 1;

Fig. 3 is a perspective view of the formed matrix;

Fig. 4 is an end elevational view of the matrix shown in Fig. 3;

Fig. 5 is a perspective view of a lower jaw fragment showing two of the improved matrices in operative positions on a molar and bicuspid, respectively;

Fig. 6 is an enlarged perspective view of a jaw fragment showing the matrix applied to a molar having a mesial-occlusal-distal cavity therein;

Fig. 7 is a perspective view similar to Fig. 6 showing the matrix applied to a bicuspid having a distal cavity therein;

Fig. 8 is a plan view of a molar having a buccal-occlusal-distal cavity therein to which the matrix has been applied; and Fig. 9 is a fragmentary jaw section showing the buckle aspect of a molar having a distal cavity with the matrix applied to the tooth and showing the manner in which a wax impression of a cavity may be made for the purpose of fitting the cavity with a dental inlay. In this view the tooth is shown in elevation, while the matrix is shown in transverse section.

In compliance with section 4888 of the Revised Statutes, a preferred form of the invention has been shown in the drawings and will be described herein, but it should be understood that the invention is not limited to the specific disclosure made, and that the appended claims should be construed as broadly as the prior art will permit.

It is contemplated that matrices constructed in accordance with the principles of the present invention shall be made in only two sizes, one size serving to accommodate molars of all sizes, and the other size, which is slightly smaller, serving to accommodate all sizes of bicuspids.

As shown in Figs. 3 and 4, the improved matrix is in the form of a seamless tubular member 10 preferably formed from copper tubing and fabricated in a manner later to be described into irregular shape with a generally cylindrical body portion 12 and a radially-extending offset portion 14. The wall of the member 10 is continuous and its upper edge 16 assumes a substantially horizontal plane while the lower edge of the member is provided with a pair of downwardly-bowed or curved lip portions 18 and 20. The offset portion 14 of the matrix is in the form of a reverse bend having an apex 22 and lower edge 24 which merges with the downwardly-bowed lips 18 and 20. Copper is preferred as the material used in the formation of the matrix because of its deformability.

As shown in Fig. 4, the upper edge or rim 16 may be crowned inwardly to a slight degree, as shown at 26. The body portion 12 of the matrix and the depending curved lips 18 and 20 are likewise curved or belled inwardly as at 28 for a purpose that will be made clear presently. The body portion 12 of the matrix is thus of slightly bowed shape in vertical transverse cross section.

The generally cylindrical body portion 12 of the matrix 10 presents a central vertical bore 30 adapted to encompass a tooth undergoing treatment while the outwardly offset loop 14 is adapted to project radially outwardly of the tooth and provides a purchase region by means of which the generally cylindrical wall of the body portion 12 may be drawn about the tooth by the use of a suitable tool, so that the matrix will assume a position on the tooth such as has been illustrated in Figs. 5 to 9 inclusive.

The matrix 10 may conveniently be formed by a stamping and shaping operation wherein a number of blanks such as the blank 32 of Figs. 1 and 2 are cut by a stamping operation from an elongated flattened strip of tubular stock. The body portion 12, lips 18, and 20, narrow offset portion 14 and reverse bend 22 are all apparent in the flattened blank of Fig. 1. After the blank has been severed from the flattened length of tubular stock the same may be opened and placed upon a suitable mandrel (not shown) and worked thereon in any suitable manner to produce the matrix of Fig. 3. While the details of the mandrel and the working instrumentalities have not been illustrated herein, it is to be noted that after the belling operation is performed on the lip regions 18 and 20 of the matrix, the matrix may be lifted from the mandrel by a slight spreading of the sides of the offset portion 14 so that the inwardly-bowed lips will clear the mandrel sides for removal purposes without destroying the belling effect.

In dental work, where mesial and distal cavities are present in molars or bicuspids having adjacent teeth, one of the general objects of any matrix is to get perfect adaptation to the floor of the cavity without permitting the filling or wax impression, in the case of inlay work, to extend into the tissue area. Another general object of any matrix is to attain a desired contouring of the filling or impression in conformity with the general outline of the particular tooth undergoing treatment where otherwise the attainment of such conformity would be difficult or impossible due to inaccessibility of the region of the cavity. The present matrix is adapted to fulfill the above-mentioned requirements in a highly satisfactory manner while at the same time the comparative inexpensiveness of manufacture of the matrix will warrant disposal of the same after it has served its purpose so that each patient is assured of a fresh unused preformed matrix. Furthermore, if, at first trial, due to possible lack of experience or judgment, a dentist prepares a particular matrix in an ill-fitting manner he may readily discard the same and apply a new one in lieu of attempting to rectify his error or readjust the original matrix.

Referring now to Fig. 5, one of the improved matrices is shown as being operatively applied to a molar 32 having a mesial cavity 34, while another matrix is shown as being applied to a bicuspid 36 having a distal cavity 38. The molar 32 and bicuspid 36 are shown as being located in their natural positions in a jaw section or fragment 40 and the particular teeth selected for illustration are the anterior molar and anterior bicuspid, respectively. The other teeth shown in the assembly are the medial and posterior molars 42 and 44, respectively, and the posterior bicuspid 46. The surrounding tissue is shown at 48. The illustration of Fig. 5 is a buccal aspect of the illustrated jaw fragment.

In the application of the matrix 10 to the molar 32, the body portion 12 is inserted over the tooth and the depending inwardly-bowed or belled lips 18 and 20 are received over the lower mesial and distal sides of the tooth, respectively, with the lips extending well into the interproximal areas and below the gum line.

The application of the matrix 10 to a molar is better illustrated in Fig. 6 wherein the molar 50 is illustrated as being provided with a mesial-occlusal-distal cavity 52. Reference to this view will serve to illustrate the manner of application of the matrix 10 to the molar 32 of Fig. 5. In Fig. 6, the lip 18 is shown as extending into the mesial interproximal space below the gum line 54 and it will be understood that, similarly, the lip 20 extends into the distal interproximal space below the gum line. The inward belling of the lips 18 and 20 permits the latter to closely follow the inwardly-belled contour of the lower mesial and distal regions of the tooth when the matrix is drawn about the tooth.

In the application of the matrix, if it is found that the overall area of the lower open end of the body portion 12 of the matrix is insufficient to allow ready insertion of the matrix over the tooth, the offset portion 22 may be spread slightly to afford clearance of the lips 18 and 20 beyond the sides of the tooth. Thereafter, by the use of a suitable tool, such as forceps, as fragmentarily shown at 56, a gentle pinching of the sides of the offset portion 14 will serve to close the bore 30 about the tooth so that a downward movement of the matrix as a whole will serve to introduce the lips into their respective interproximal areas below the gum line 54. Thereafter, a progressive pinching, gathering or "creeping" operation on the offset portion 14 by the tool 56 may be resorted to to tighten the body portion 12 around the tooth so that the matrix 10 will assume the position shown in Fig. 6 relative to the molar 50, or the position shown in Fig. 5 relative to the molar 32.

In operating upon the offset portion 14 in the manner described above, the body portion 12 is drawn tightly about the tooth so that it will assume the general shape of the tooth. Of course, where a particular molar is provided with an indentation such as the lingual indentation 58, a portion of the wall of the matrix will bridge this indentation in spaced relation to the surface thereof. Otherwise, the wall of the matrix will conform generally to the contour of the tooth and will even closely follow the mesial-buccal, distal-buccal, mesial-lingual and distal-lingual corners of the tooth as shown.

Referring again to Fig. 5, the applied matrix 10 when in position, possesses a sufficient degree of rigidity or resistance to expansion that the mesial cavity may be filled in the usual manner of filling without danger of spreading of the matrix. It is not necessary that the tool 56 remain applied to the offset portion 14 and the dentist is thus free to use both hands in the performance of his work. The inwardly-bowed lip 18 will permit good adaptation of the wax or amalgam to the floor of the cavity and extends sufficiently below the amalgam gum line so that very deep cavities may be easily dealt with.

After the tooth has been treated, the matrix 10 may readily be removed by a spreading or a cutting away operation performed upon the offset portion 14, and the removed matrix may be discarded. It will be found that because of the relatively high degree of ductility of the copper material of the matrix, the outer surfaces of the wax or amalgam filling material will conform precisely to the true outline of the tooth and a minimum of finishing operations will be required.

In the treatment of both molars and bicuspids the matrix will ordinarily be applied to the tooth with the offset portion 14 extending radially outwardly from the body portion 12 in the direction of the cheek. In certain instances, however, the matrix may be applied so that the offset portion 14 extends in a lingual direction as shown in connection with the bicuspid 36 of Fig. 5 or the bicuspid 60 of Fig. 7. In this latter view, the tooth 60 is shown in a jaw fragment 62, together with an adjacent canine 64. When so applied the inwardly bowed lip 18 of the matrix overlies the lower distal regions of the tooth and extends into the interproximal area on this side of the latter. Tightening of the offset or purchase portion 14 by the tool 56 may readily be accomplished with the tool bridging the occlusal region of the tooth so that the sides of the body portion 12 will bridge the distal cavity 66.

The present matrix is admirably well adapted for use in connection with the filling of mesial-occlusal-distal cavities or "M. O. D." of the type shown at 52 in Fig. 6, and when the matrix 10 is applied to the tooth 50 in the manner previously described, the anterior side of the matrix will bridge the mesial portion of the cavity while the posterior side of the matrix will bridge the distal portion of the cavity. The adjacent bicuspid 68 is maintained separated from the molar 60 by one wall of the body portion 12 of the matrix and, as in the case of the tooth 32 of Fig. 5, the lip 18 permits deep adaptation to the floor of the mesial portion of the cavity and prevents the amalgam from entering the tissue area between adjacent teeth. Similarly, the lip 20 separates any existing adjacent molar from the tooth 50 and permits adaptation of the filling to the floor of the distal portion of the cavity.

The improved matrix is well adapted for treatment of teeth such as the molar 70 of Fig. 8 having a buccal-occlusal-distal cavity 72. In treating such a tooth the matrix must necessarily be applied in such a manner that the offset or purchase portion 14 extends in a lingual direction in order that the continuous buccal side wall of the body portion 12 shall bridge the buccal portion of the cavity 72 and in order that the continuous anterior side wall of the body portion 12 shall bridge the distal portion of the cavity. The mode of application of the matrix to and the manner of removal thereof from the tooth 70 remains substantially the same as the manner of application and removal of the matrix to the bicuspids 36 and 60 of Figs. 5 and 7, respectively.

In Fig. 9 one of the matrices 10 is shown as being applied to a molar 74 having a distal cavity 76 requiring a distal inlay as shown. The inwardly-bowed depending lip 18 projects into the interproximal area between the tissue 48 and lower base portion or upper root portion of the mesial side of the tooth, while the lip 20 projects into the interproximal region between the tissue 48 and distal side of the tooth below the gum line 54. The offset or purchase portion 14 has been shown as extending in a lingual direction for convenience of illustration but more often than not this portion of the matrix will extend outwardly from the buccal side of the tooth. With the matrix thus positioned on the tooth, the wax material 78 is pressed into the cavity and allowed to harden. Thereafter, the occlusal surface may be curved to shape, the matrix removed as previously described, the wax material further finished in a well-known manner, the wax impression removed by suitable sprue formers (not shown) preparatory to casting operations to provide the desired inlay in a manner well known in the art. As in the case of the matrices shown in the other views, the matrix 10, after removal from the tooth 74, may be discarded.

The invention is not to be limited to the exact arrangement of parts shown in the accompanying drawings or described in this specification as various changes in the details of construction may be resorted to without departing from the spirit of the invention. For example, while it is preferred that the matrices be formed in two sizes to accommodate molar and bicuspids, respectively, subdivisions of these sizes may be resorted to to accommodate molars ranging from oversize down to undersize bicuspids. The degree of crowning or belling of the upper and lower rim portions of the body portion 12 of the matrix may be varied to accommodate the variations in crowning or belling of tooth shapes. Ordinarily, however, manufacture of the matrices in the two sizes mentioned will suffice for most dental work.

While it is obvious that matrices constructed in accordance with the principle of the present invention may be fashioned by hand to accommodate the requirements of any particular tooth, it has been found that if the over-all depth of the articles is nine millimeters in extent, they will accommodate the deepest molar or bicuspid that would ordinarily be encountered in practice. Similarly, it has been found that if the articles are constructed from tubular stock which is from nine to eleven millimeters in diameter, they will accommodate all bicuspids, while if they are formed from tubular stock ranging from eleven to thirteen millimeters in diameter, they will accommodate all molars ordinarily encountered.

While the preferred material for construction of the matrices is relatively soft commercial ductile copper sheet material, it will be understood that other metallic or plastic materials having the required degree of ductility may be employed where expedient.

I claim:

1. A dental matrix comprising a unitary seamless tubular band formed of relatively soft, permanently deformable material having a central bore therethrough designed for reception therein of the exposed portion of a tooth, the lower rim of said band being formed with a pair of spaced downwardly-extending lips adapted to be projected into the interproximal area of the tooth on the mesial and distal sides thereof, and a limited extent of said band between said lips constituting a purchase region adapted to be gathered together to constrict the remaining portion of the band around the tooth, the overall height of said band being greater than the overall exposed height of a tooth to which the matrix is to be applied.

2. A dental matrix comprising a unitary seamless tubular band formed of relatively soft, permanently deformable material having a central bore therethrough designed for reception therein of the exposed portion of a tooth, the lower rim of said band being formed with a downwardly-extending inwardly-bowed lip adapted to be projected into the interproximal area of the tooth, a limited extent of said band constituting a purchase region adapted to be gathered together to constrict the remaining portion of the band around the tooth, the overall height of said band being in excess of the overall height of the tooth to which the matrix is to be applied.

3. A dental matrix comprising a unitary seamless tubular band formed of relatively soft, permanently deformable material having a central bore therethrough designed for reception therein of the exposed portion of a tooth, the lower rim of said band being formed with a pair of spaced downwardly-extending inwardly-bowed lips adapted to be projected into the interproximal area of the tooth on the mesial and distal sides thereof, and a limited extent of said band between said lips constituting a purchase region adapted to be gathered together to constrict the remaining portion of the band around the tooth, the overall exposed height of said band being greater than the overall height of a tooth to which the matrix is to be applied.

4. A preformed dental matrix comprising a unitary seamless tubular member formed of thin, relatively soft, permanently deformable material having walls providing an enlarged body portion of generally cylindrical configuration having a pair of substantially diametrically-opposed, inwardly-bowed lips at the lower rim portion thereof, the lower margin of the lips being rounded and a generally radially-extending offset portion having substantially straight sides connected together by a relatively sharp reverse bend, said offset portion providing a purchase region adapted to be compressed by a gathering operation to constrict the walls of said body portion about a tooth.

5. A preformed dental matrix comprising a unitary seamless tubular member formed of thin, relatively soft, permanently deformable material having walls providing an enlarged body portion of generally cylindrical configuration having a pair of downwardly-extending curved inwardly-bowed lips formed on the lower rim portion thereof, and a generally radially-extending offset portion having substantially straight slightly spaced sides connected together by a relatively sharp reverse bend, said offset portion providing a purchase region adapted to be compressed by a gathering operation to constrict the walls of said body portion about a tooth, all portions of the upper rim of said member lying within a common plane, and the upper regions of said body portion being bowed inwardly.

References Cited in the file of this patent
UNITED STATES PATENTS

| Number | Name | Date |
|---|---|---|
| 638,973 | Mehlig | Dec. 12, 1899 |
| 1,669,231 | Curran | May 8, 1928 |
| 1,670,361 | Johnson | May 22, 1928 |